July 9, 1940.  D. W. HUDGINGS, JR  2,207,668
SUN VISOR
Filed Jan. 20, 1939  2 Sheets-Sheet 1

Inventor
DANIEL W. HUDGINGS, JR.

Leeland Radus, Attorneys

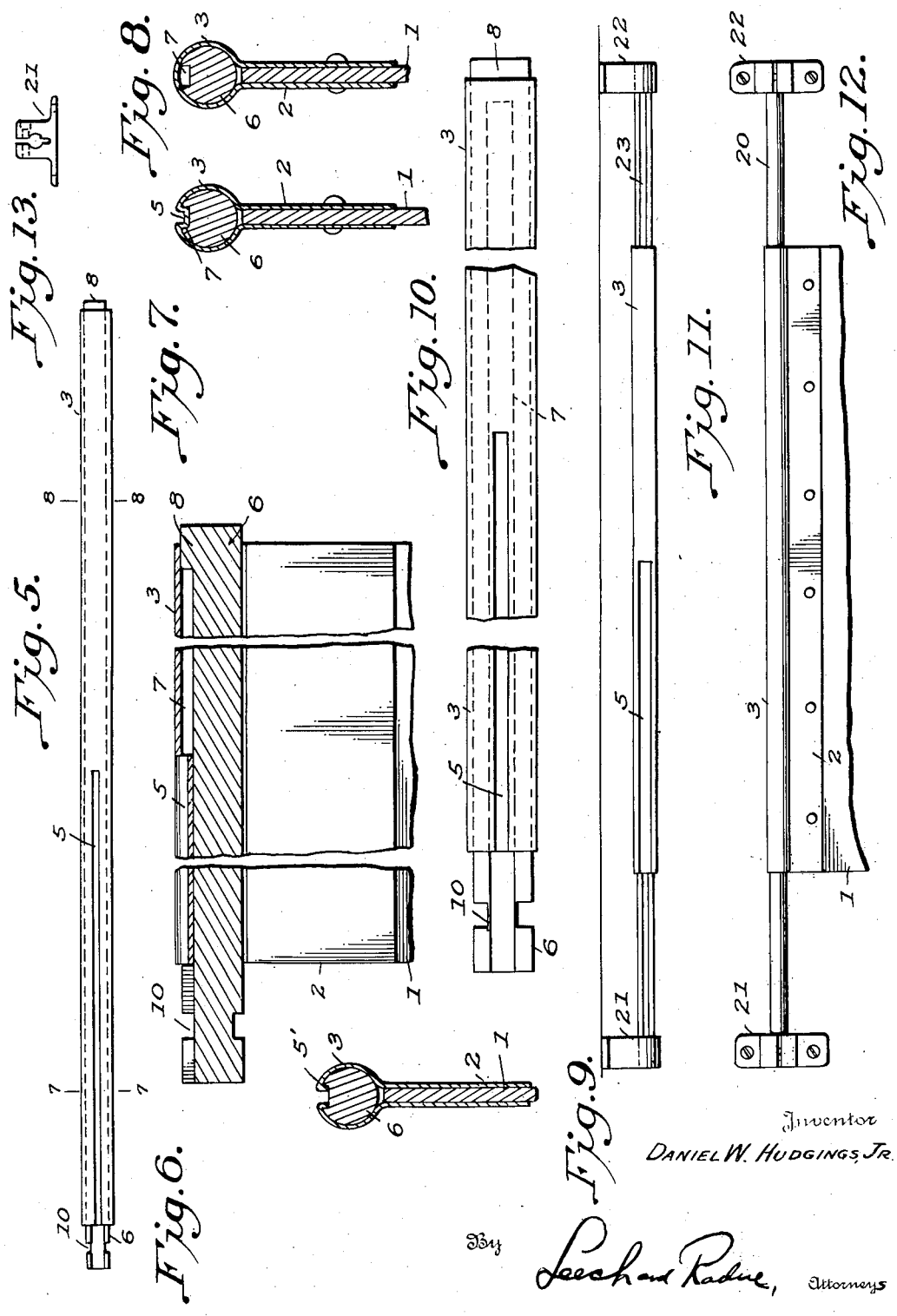

Patented July 9, 1940

2,207,668

UNITED STATES PATENT OFFICE 2,207,668

SUN VISOR

Daniel W. Hudgings, Jr., Tampa, Fla., assignor of two-fifths to E. Neil Williams, Washington, D. C.

Application January 20, 1939, Serial No. 252,016

2 Claims. (Cl. 296—97)

The object of this invention is to improve the construction of automobile vehicle sun visors, and, more particularly, to provide a sun visor of considerable more versatility than the present types now in use.

An object of this invention is to construct a sun visor which will more fully protect the operator's vision when driving towards the sun or oncoming headlights and to so mount and construct the visor that it may be readily positioned both directly in front of the operator's vision while permitting lateral adjustment to afford protection when the objectionable light rays are coming into the automobile at the right or center of the vehicle, which would normally not be possible with conventional types of visors.

Another object is to mount the visor on a swivel connection which permits its use not only in front but at the driver's side to protect the vision from the side rays of the sun.

A still further object is to so simplify the manufacture of the present visor that its component parts are few, fool proof in operation, positive in action, and economical to manufacture and fabricate and maintain.

The construction which will be hereinafter described in detail is also adaptable for use with a fixed support mounted across the entire front of the vehicle so that it may be adjusted at any point behind the windshield or, if desirable, the same type of protector may be mounted over the doors of the vehicle.

In the drawings,

Fig. 5 is a top plan of the visor shown in Fig. 2;

Fig. 6 is an enlarged fragmental cross section of the supporting rod and visor;

Fig. 7 is a cross section taken on line 7—7 of Fig. 5;

Fig. 8 is a cross section taken on line 8—8 of Fig. 5;

Fig. 9 is a similar cross section of a modified visor rod;

Fig. 10 is an enlarged fragmental top view of the visor rod shown in Fig. 5;

Fig. 11 is a top view of a modified sun visor adapted to be installed across the front of the automobile interior or over the doors;

Fig. 12 is a front view of the modified form;

Fig. 13 is a side view of a hanger for the modified sun visor.

Figure 1:
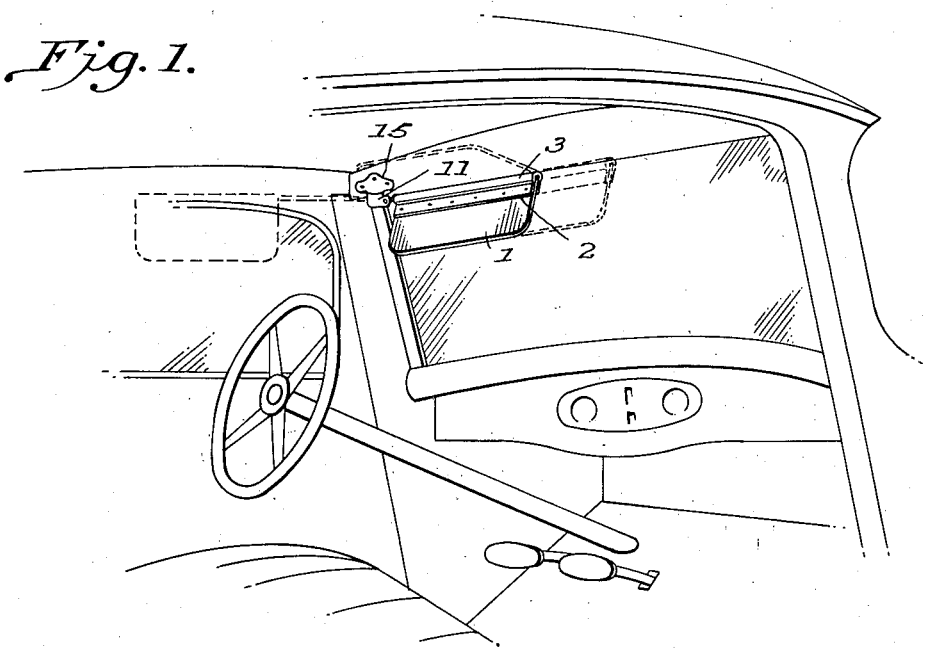
Fig. 1 is an interior view of an automobile equipped with the present invention and showing the sun visor in several operative positions.
Figure 2:
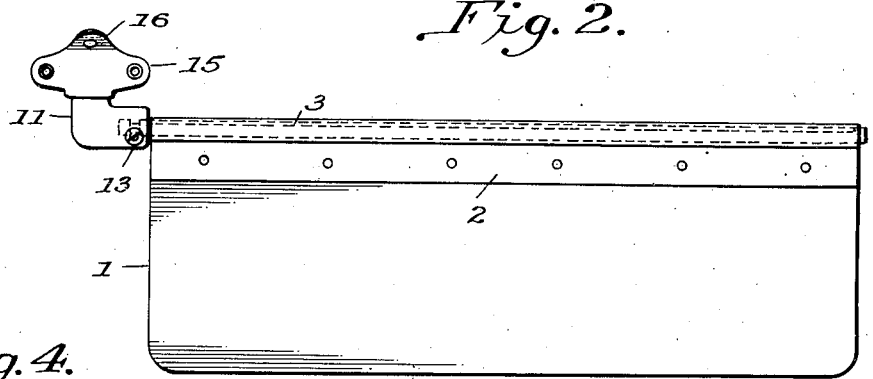
Fig. 2 is a front view of the visor together with its swivel hanger.
Figure 4:
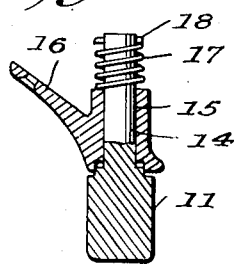
Fig. 4 is a vertical section of the hanger taken on line 4—4 of Fig. 3.

More particularly, the opaque shield or visor 1 preferably made from a sheet of fiber, molded resin or wood is secured between the outwardly extending spaced parallel arms 2 of a sheet metal tubular hinge 3, the visor per se being suitably retained between the spaced offset portions 2 by means of screws, rivets or other suitable fastening means.

As shown in detail in Figs. 5, 6, and 10, the tubular portion 3 is provided with a depending key 5 along approximately one-half of its length, the tubular member with its depending visor being positioned around a round rod 6, which has a longitudinal groove 7 therein extending from one end of the rod to a point adjacent the opposite end of the rod. By not carrying the groove completely throughout the length of the rod, an end stop or abutment 8 for the groove 7 is provided.

As before described, the tubular member 3 is depressed for approximately half its length at the left portion of the tube, as shown in the drawings, and, therefore, this depressed section or key 5 rides snugly within the keyway 7 when the parts are assembled. Inasmuch as the keyway 7 extends to the edge of the rod at the left portion thereof, as shown in the drawings, the tubular member 3 with its key 5 is very simply threaded or slid onto the rod 6.

Such a construction insures that the rod and tubular member are always in snug frictional contact, and it will be obvious that the entire visor may be easily and quickly moved to the right in the drawings until the key portion 5 strikes the end stop 8 and thus the visor may be adjusted from a point at the left section of the front of the vehicle to a position well over towards the right side thereof and objectionable rays may thus be blocked out by use of a single shield.

At the end of the rod 6, through which the slot 7 extends, there is a circumferential groove 10 for the purpose of holding the rod and visor in a swivel connection 11 having a socket 12 for the insertion of the end of the rod and a transverse set screw 13 which cooperates with the groove 10 to retain the visor and the rod in frictional relative position.

The socket portion 12 of the swivel has a right angle vertical pivot portion 14 carried in bore 15 of the bushing 16 which is suitably fastened above the windshield or other portion of the automobile body. A spring 17 rests on the upper edge of the bushing 16 and encircles the upper end of pivot 14 being retained by pin 18. Thus the rod 6 is supported in a swivel connection which permits the visor to be positioned either at the front or side of the driver and also allows the visor to be raised or lowered by manipulation thereof to position it adjacent the top of the vehicle body or in down-turned position in line with the driver's vision. The turning up or down of the visor 1 also rotates the rod 6 which is permitted by the groove 10 and screw 13 to have frictional contact to the rod while permitting its easy manipulation.

As a modification of the continuous depressed key 5 integrally formed of the metal of the tube 3, I may use a structure similar to that shown in Fig. 9. Here, instead of stretching and depressing the metal, the tube or hinge is slit longitudinally and the sides 5' are turned inwardly to bear against the vertical walls of the groove 7. As in the preferred form, the in-turning sides or fingers 5' frictionally contact the sides and bottom wall of the groove so that the shield may be laterally moved and retained in adjusted position. The fingers are also sufficiently rigid to rotate the rod 6 when the visor is raised or lowered.

Figure 3:
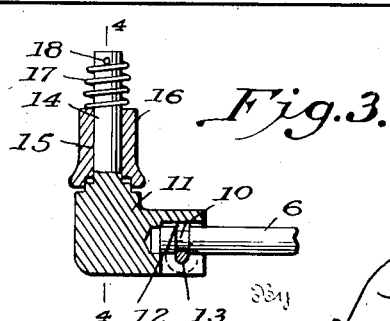
Fig. 3 is an enlarged view, partly in cross section of the hanger illustrating the means of securing the visor rod.

In Figs. 11 and 12, I have shown a further modification of my sun visor in which the shield is mounted for transverse and vertical adjustment without the use of a swivel connection as heretofore described. In this modified visor support, a rod 20 extends across the entire front of the windshield or it may be mounted over the doors of the car; the rod being retained in end brackets 21 and 22. Where the car has a V-type windshield, two separate rods may be used running from the center to the sides of the body. The rod is continuously grooved to form a keyway 23, and preferably the end of the rod shown at the right of the drawings is retained in an opening or socket in bracket 22, while the left-hand end of the rod in the drawings is frictionally retained between the split arms of the bracket 21, as shown in detail in Fig. 3. The tension on the rod may be adjusted by a screw connecting the split arms of the bracket and for ready removal of the rod for insertion of the visor or for servicing.

Having described my invention, what I claim as new and desire to secure by Letters Patent of the United States is:

1. A sun visor for vehicle bodies including a rotatable rod secured within the vehicle body, a tubular member encompassing said rod and adjustable therealong, a light obstructing shield secured between the free ends of the tubular member, a longitudinal groove formed in said rod and an integral depending key pressed from the material of the tubular member for sliding engagement with said groove.

2. A sun visor of the character claimed in claim 1 wherein the integral key is formed by longitudinally splitting the material of the tubular member and inturning the edges of the slit portion to frictionally engage the sides of the groove in the rod.

DANIEL W. HUDGINGS, Jr.